(12) United States Patent
Abe (10) Patent No.: US 12,000,452 B2
(45) Date of Patent: Jun. 4, 2024

(54) CYLINDRICAL ANTIVIBRATION DEVICE FOR MOTOR MOUNT

(71) Applicant: Sumitomo Riko Company Limited, Aichi (JP)

(72) Inventor: Junji Abe, Aichi (JP)

(73) Assignee: Sumitomo Riko Company Limited, Aichi (JP)

( * ) Notice: Subject to any disclaimer, the term of this patent is extended or adjusted under 35 U.S.C. 154(b) by 473 days.

(21) Appl. No.: 17/226,089

(22) Filed: Apr. 9, 2021

(65) Prior Publication Data

US 2021/0222753 A1     Jul. 22, 2021

Related U.S. Application Data

(63) Continuation of application No. PCT/JP2020/008129, filed on Feb. 27, 2020.

(30) Foreign Application Priority Data

Feb. 28, 2019   (JP) ................. 2019-037000

(51) Int. Cl.
     *F16F 15/08*      (2006.01)
     *B60K 1/00*      (2006.01)

(52) U.S. Cl.
     CPC ............... *F16F 15/08* (2013.01); *B60K 1/00* (2013.01); *F16F 2224/025* (2013.01); *F16F 2230/0005* (2013.01); *F16F 2234/02* (2013.01)

(58) Field of Classification Search
CPC .... F16F 1/3835; F16F 1/387; F16F 2224/025; F16F 2230/0005; F16F 2234/02; B60K 1/00; B60K 5/1225
See application file for complete search history.

(56) References Cited

U.S. PATENT DOCUMENTS

| 3,323,763 A | 6/1967 | Butts |
|---|---|---|
| 8,167,286 B2 | 5/2012 | Hirano et al. |

(Continued)

FOREIGN PATENT DOCUMENTS

| DE | 19526750 | 1/1997 |
|---|---|---|
| JP | H03117137 | 12/1991 |

(Continued)

OTHER PUBLICATIONS

"International Search Report (Form PCT/ISA/210) of PCT/JP2020/008129," mailed on Apr. 14, 2020, with English translation thereof, pp. 1-4.

(Continued)

*Primary Examiner* — Robert A. Siconolfi
*Assistant Examiner* — San M Aung
(74) *Attorney, Agent, or Firm* — JCIPRNET (57) ABSTRACT

Provided is a cylindrical antivibration device for a motor mount mounted between an electric motor for driving and support members in an automobile, the cylindrical antivibration device having an inner shaft member and an outer cylinder member which are coupled by a body rubber elastic element, in which surfaces of the inner shaft member and the outer cylinder member that face each other in a direction perpendicular to the shaft are continuously coupled over the entire circumference via the body rubber elastic element. On an axial end surface of the body rubber elastic element, an elastic protrusion, that protrudes outward in the axial direction and extends circumferentially in an intermediate portion between the facing surfaces of the inner shaft member and the outer cylinder member, is formed integrally with the body rubber elastic element.

8 Claims, 7 Drawing Sheets

(56) References Cited

U.S. PATENT DOCUMENTS

| | | | | |
|---|---|---|---|---|
| 9,556,903 B2* | 1/2017 | Conrad | ............... | F16C 27/063 |
| 2008/0258364 A1* | 10/2008 | Hirano | ..................... | F16F 1/38 |
| | | | | 267/136 |
| 2009/0289399 A1* | 11/2009 | Suzuki | ................... | B60G 3/20 |
| | | | | 267/140.12 |
| 2016/0208879 A1* | 7/2016 | Conrad | .................. | F16F 1/393 |

FOREIGN PATENT DOCUMENTS

| | | |
|---|---|---|
| JP | H07156663 | 6/1995 |
| JP | H0914348 | 1/1997 |
| JP | 2009068619 | 4/2009 |
| JP | 2011195058 | 10/2011 |
| JP | 4839258 | 12/2011 |
| JP | 2015025472 | 2/2015 |

OTHER PUBLICATIONS

"Written Opinion of the International Searching Authority (Form PCT/ISA/237) of PCT/JP2020/008129," mailed on Apr. 14, 2020, with English translation thereof, pp. 1-12.
"Office Action of China Counterpart Application" with English translation thereof, issued on May 17, 2022, p. 1-p. 20.
"Office Action of Deutsches Counterpart Application" with English translation thereof, issued on Feb. 2, 2024, p. 1- p. 14.

\* cited by examiner

CYLINDRICAL ANTIVIBRATION DEVICE FOR MOTOR MOUNT

CROSS-REFERENCE TO RELATED APPLICATION

The present application is a continuation of PCT/JP2020/008129, filed on Feb. 27, 2020, and is related to and claims priority from Japanese patent application no. 2019-037000 (filed on Feb. 28, 2019). The entire contents of the aforementioned application are hereby incorporated by reference herein.

TECHNICAL FIELD

The present invention relates to a cylindrical antivibration device used for a motor mount that supports an electric motor for driving of an electric vehicle.

BACKGROUND ART

In recent years, due to growing interest in environmental issues, environment-friendly vehicles that adopt electric motors instead of internal combustion engines as driving sources have been proposed.

Incidentally, in most environment-friendly vehicles, a structure in which only a power unit including a conventional internal combustion engine is changed to a driving unit including an electric motor has been considered, as disclosed in Japanese Patent Laid-Open No. 7-156663 (Patent Literature 1). Thus, a mounting device that causes an electric motor for driving being a driving unit to be antivibration-supported by a support member on a vehicle body side adopts a structure which is substantially the same as that of a mounting device of the power unit including the conventional internal combustion engine.

However, the internal combustion engine and the electric motor greatly differ not only in the structure thereof but also in output properties and the like, and a mounting device capable of exhibiting appropriate antivibration performance for the electric motor for driving has not yet been realized.

CITATION LIST

Patent Literature

Patent Literature 1: Japanese Patent Laid-Open No. 7-156663

SUMMARY

Technical Problem

Specifically, for example, an electric motor that generates a large torque in a low rotation speed range and an internal combustion engine in which a torque increases in a high rotation range have different required properties for an antivibration device that receives a torque reaction. In addition, an internal combustion engine having an idling vibration problem and an electric motor having no idling greatly differ in required antivibration performance of a low frequency vibration. Further, an internal combustion engine to which a rotational force generated due to explosion occurring once in two rotations of an output crankshaft is applied, but an electric motor has a rotational force which is applied to an output shaft several to several tens of times for each rotation of the output shaft in accordance with the number of magnetic poles of a magnet or a coil have different vibration frequency ranges caused by a torque fluctuation of an output. And, an antivibration device for an electric motor is generally required to have an antivibration performance based on a torque fluctuation of up to approximately 1000 Hz, while an internal combustion engine is only required to have an antivibration performance for a high frequency engine vibration of approximately 100 Hz at the highest. Additionally, a driving reaction applied to an antivibration device is generated when a vehicle starts or accelerates in a vehicle using an internal combustion engine as a driving source, while a large driving reaction is applied during braking of a vehicle due to the use of a regenerative brake in a vehicle using an electric motor as a driving source, and there are also differences in static spring properties and support spring rigidity required for antivibration devices.

The problem to be solved by the present invention is to provide an antivibration device which is superior to an antivibration mount of a conventional internal combustion engine for driving by improving antivibration properties or supporting properties from the above-described perspective, as a motor mount used in a vehicle including an electric motor for driving.

Solution to Problem

Hereinafter, preferred aspects for understanding of the present invention will be described. However, the aspects to be described below are examples and can be appropriately adopted in combination with each other. In addition, a plurality of components described in each aspect can also be recognized as being able to be adopted independently, and can also be appropriately adopted in combination with any one component described in another aspect. Thereby, the present invention is not limited to the following aspects, and various other aspects can be realized.

According to a first aspect, there is provided a cylindrical antivibration device for a motor mount which is configured such that an inner shaft member and an outer cylinder member are connected to each other by a rubber elastic element and is mounted between an electric motor for driving of a vehicle and a support member, in which facing surfaces of the inner shaft member and the outer cylinder member in a direction perpendicular to the shaft are continuous over an entire circumference in a circumferential direction and are connected to each other by the body rubber elastic element, and an elastic protrusion that protrudes outward in an axial direction at an intermediate portion between the facing surfaces of the inner shaft member and the outer cylinder member and extends in the circumferential direction is formed integrally with the body rubber elastic element on an end face of the body rubber elastic element in the axial direction.

In the present aspect, it is possible to realize the antivibration device suitable for a motor mount by providing the elastic protrusion that protrudes in an axial direction from the body rubber elastic element, having a substantially annular or cylindrical shape, which is continuous over the entire circumference in a circumferential direction. For example, the facing surfaces of the inner shaft member and the outer cylinder member in a direction perpendicular to the shaft may be elastically connected by the body rubber elastic element to be continuous over the entire circumference in the circumferential direction, and thus it becomes easy to set an effective support spring rigidity with respect to a relatively large external force in a direction perpendicular to the shaft which is applied by a driving torque and a regenerative brake under most vehicle traveling conditions.

Here, for a configuration in which support spring rigidity is secured by the body rubber elastic element which is continuous over the entire circumference in the circumferential direction, there is concern of a reduction in antivibration performance with respect to dynamic input vibration. Moreover, in an antivibration device for a conventional internal combustion engine, low dynamic spring properties of a low frequency range are required to cope with idling vibration. However, since an electric motor for driving of an electric vehicle does not have idling vibration in the first place, antivibration performance in a low frequency range is unlikely to be a problem in the antivibration device for a motor mount.

Additionally, in a high frequency range, it is possible to curb increase in dynamic spring performance of the body rubber elastic element by providing the elastic protrusion that protrudes from the body rubber elastic element in the axial direction. For this reason, it is possible to realize satisfactory antivibration performance by avoiding a significant increase in dynamic spring performance over a wide frequency region of medium to high frequencies, particularly over a high frequency range that has not been a problem in the antivibration device for a conventional internal combustion engine.

Further, in the present aspect, the elastic protrusion extends in the circumferential direction of the body rubber elastic element and has a curved shape, which is also advantageous in securing the volume of the elastic protrusion and securing deformation rigidity of the elastic protrusion itself without significantly impairing the free surface area of the body rubber elastic element. As a result, for example, it is possible to easily avoid a significant increase in dynamic spring performance of the body rubber elastic element, which can also contribute to securing of support spring rigidity of the body rubber elastic element to a considerable extent.

According to a second aspect, in the cylindrical antivibration device for a motor mount according to the first aspect, the elastic protrusion is formed as an annular elastic protrusion provided continuously over an entire circumference of the body rubber elastic element in the circumferential direction.

In the cylindrical antivibration device for a motor mount of the present aspect, the elastic protrusion is formed as an annular elastic protrusion extending over the entire circumference, and thus it is possible to easily secure the volume of the elastic protrusion as a whole and achieve a further improvement in the above-described technical effect using the elastic protrusion.

According to a third aspect, in the cylindrical antivibration device for a motor mount according to the first or second aspect, both end faces of the body rubber elastic element in the axial direction are configured as tapered inclined surfaces by a dimension of the body rubber elastic element in the axial direction gradually decreasing toward the outer cylinder member side from the inner shaft member side, and the elastic protrusion protrudes from the tapered inclined surface of the body rubber elastic element.

In the cylindrical antivibration device for a motor mount of the present aspect, the protruding surface of the elastic protrusion in the body rubber elastic element is formed as a tapered inclined surface, and thus it is possible to set a large connection area of the elastic protrusion to the body rubber elastic element without increasing the dimension of the diameter of the body rubber elastic element. As a result, it is possible to achieve an improvement in an effect on spring properties of the body rubber elastic element which is applied by the elastic protrusion.

According to a fourth aspect, in the cylindrical antivibration device for a motor mount according to any one of the first to third aspects, a protrusion height of the elastic protrusion protruding from a surface of the body rubber elastic element is smaller than a length of the body rubber elastic element in the axial direction.

In the cylindrical antivibration device for a motor mount of the present aspect, an adverse effect that may occur due to an excessive increase in a protrusion height of the elastic protrusion in the axial direction is reduced or avoided. For example, it is also possible to reduce or eliminate concerns about interference of the elastic protrusion with other members, a mounting space problem, an adverse effect on antivibration properties of the body rubber elastic element due to higher-order resonance of the elastic protrusion, and the like.

According to a fifth aspect, in the cylindrical antivibration device for a motor mount according to any one of the first to fourth aspects, a thickness dimension of the elastic protrusion of the body rubber elastic element in a direction perpendicular to the shaft is $\frac{1}{3}$ or less of a thickness dimension of the body rubber elastic element.

In the cylindrical antivibration device for a motor mount of the present aspect, it is also possible to reduce or eliminate an adverse effect that may occur due to an excessive increase in the thickness of the elastic protrusion, for example, an adverse effect on antivibration properties accompanying a reduction of a free surface of the body rubber elastic element, an excessive restraint action of the body rubber elastic element by the elastic protrusion, or the like.

According to a sixth aspect, in the cylindrical antivibration device for a motor mount according to any one of the first to fifth aspects, the thickness dimension of the elastic protrusion of the body rubber elastic element in a direction perpendicular to the shaft decreases toward a tip end side from a base end side of the elastic protrusion.

In the cylindrical antivibration device for a motor mount of the present aspect, it is possible to set a punching taper at the time of demolding in the protruding direction of the elastic protrusion, which facilitates manufacture. In addition, for example, it also becomes easy to perform tuning for avoiding an adverse effect on antivibration performance in a frequency range of low to medium frequencies in the body rubber elastic element by avoiding a resonance phenomenon in a low frequency range of the elastic protrusion while securing the volume of the elastic protrusion.

According to a seventh aspect, in the cylindrical antivibration device for a motor mount according to any one of the first to sixth aspects, a main input direction of antivibration target vibration applied between the inner shaft member and the outer cylinder member is one direction of a direction perpendicular to the shaft, and the elastic protrusion is present on at least both sides in a direction perpendicular to the shaft orthogonal to the main input direction of the antivibration target vibration and extends in the circumferential direction.

In the cylindrical antivibration device for a motor mount of the present aspect, it is possible to generate a compression/tension deformation mode for the elastic protrusion in a main input direction of antivibration target vibration. Thereby, a phase difference of the elastic protrusion is suitably generated, and tuning to a natural frequency of the body rubber elastic element is facilitated. For this reason, it is also possible to achieve a further improvement in a suppression effect as described later which is considered to be exerted by the elastic protrusion excited with a phase difference from the body rubber elastic element, with respect to a significant increase in an absolute spring constant caused by the surging of a cylindrical antivibration device (body rubber elastic element) in a high frequency range of 500 Hz to 1000 Hz which tends to become a problem in motor mounts.

According to an eighth aspect, in the cylindrical antivibration device for a motor mount according to any one of the first to seventh aspects, an electric motor for driving of a battery-driven electric vehicle is antivibration-supported, the body rubber elastic element has a peak of an absolute spring constant due to surging in a frequency range of 500 Hz to 1000 Hz, a secondary resonance point in the elastic protrusion is set to be in a frequency range lower than the peak of the absolute spring constant due to the surging of the body rubber elastic element, and the peak of the absolute spring constant due to the surging of the body rubber elastic element is reduced on the basis of an elastic deformation action of the elastic protrusion having a phase difference from the body rubber elastic element by providing the elastic protrusion.

In the cylindrical antivibration device for a motor mount of the present aspect, it is possible to reduce a peak of an increase in dynamic spring performance caused by the surging of the body rubber elastic element in a frequency range of 500 Hz to 1000 Hz which tends to become a problem in general environment-friendly vehicles, and to realize satisfactory performance as a motor mount of an electric vehicle.

Effect of the Invention

According to embodiments of the present invention, it is possible to provide an antivibration device which is more excellent than an antivibration mount of a conventional internal combustion engine for driving, as a cylindrical antivibration device for a motor mount that supports an electric motor for driving of an electric vehicle.

DESCRIPTION OF EMBODIMENTS

Hereinafter, embodiments of the present invention will be described in detail with reference to the drawings in order to clarify the present invention more specifically.

Figure 1:
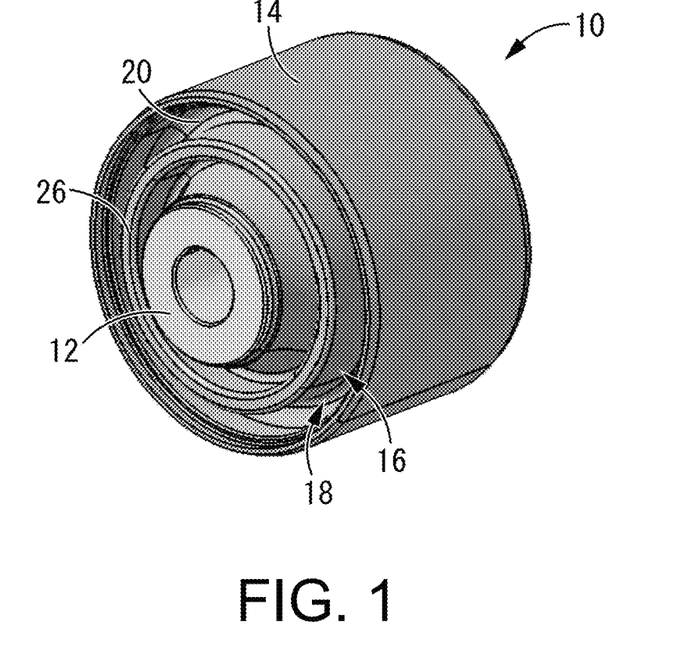
FIG. 1 is a perspective view illustrating a cylindrical antivibration device for a motor mount according to a first embodiment of the present invention.
Figure 2:
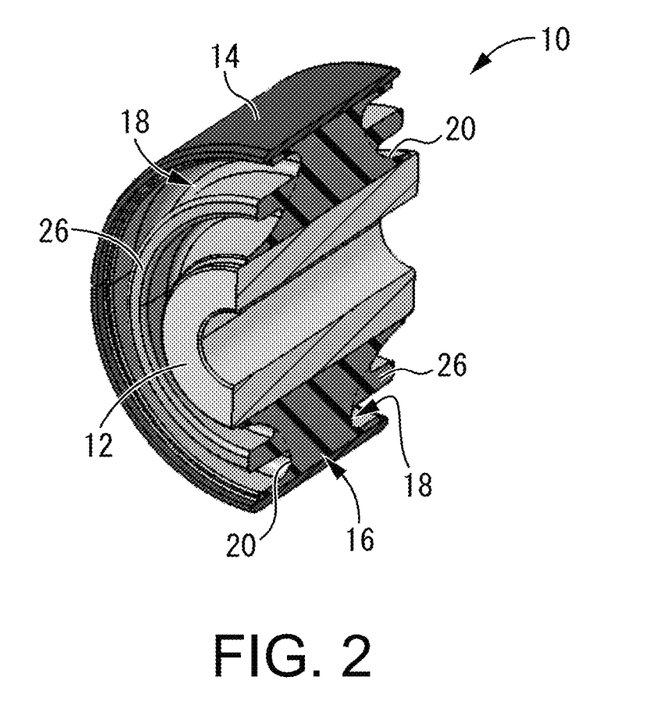
FIG. 2 is a longitudinal sectional perspective view of the cylindrical antivibration device for a motor mount illustrated in FIG. 1.
Figure 3:
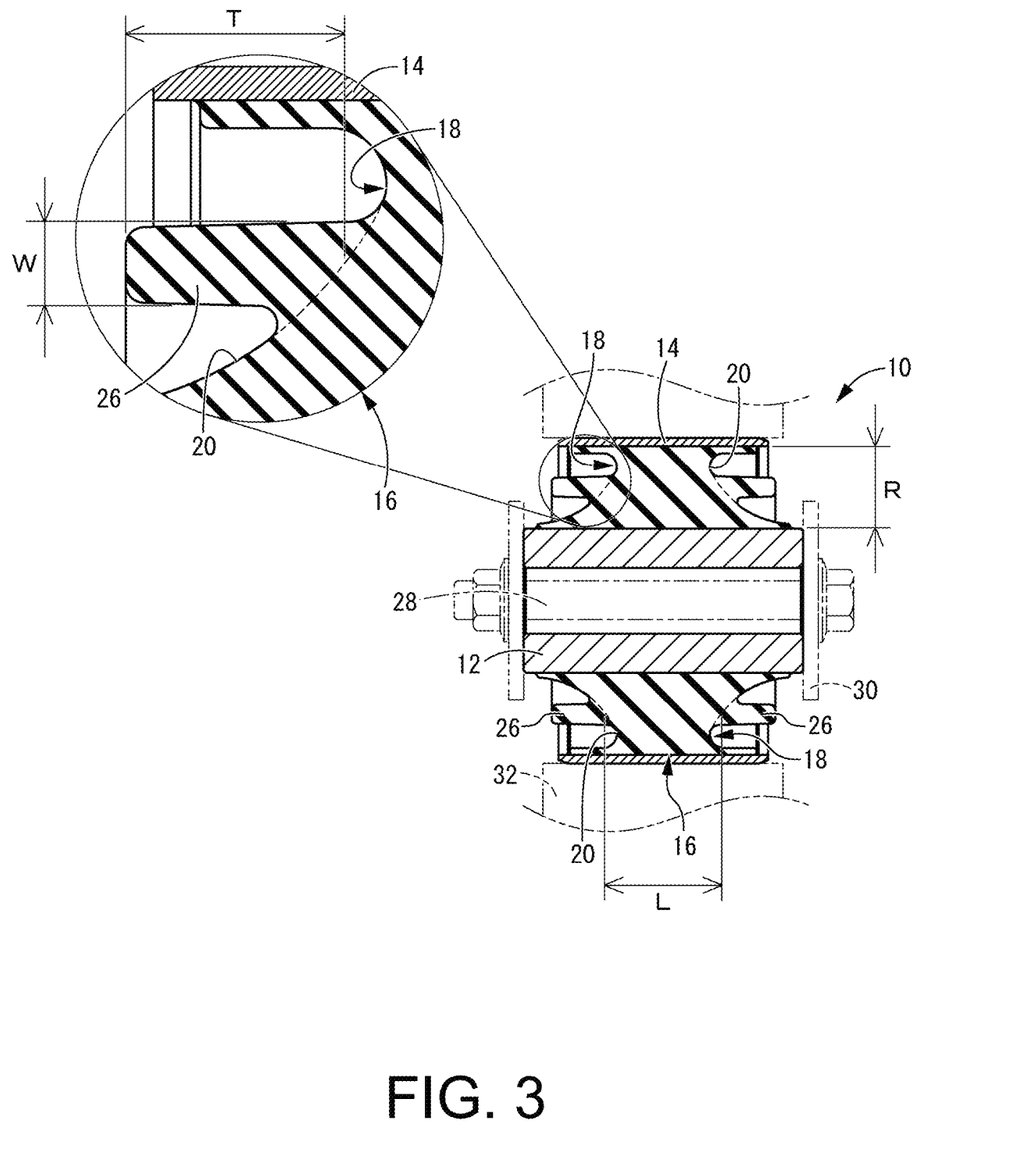
FIG. 3 is a longitudinal sectional view of the cylindrical antivibration device for a motor mount illustrated in FIG. 1.

First, FIGS. 1 to 3 illustrate a cylindrical antivibration device 10 for a motor mount of a battery-driven electric vehicle according to an embodiment of the present invention. The cylindrical antivibration device 10 for a motor mount of the present embodiment elastically connects, for example, an electric motor for driving of a battery-driven electric vehicle and a vehicle body to cause the electric motor for driving to be antivibration-supported by the vehicle body. Meanwhile, in the following description, an axial direction refers to a right-left direction in FIG. 3 which is a central axial direction of the cylindrical antivibration device 10 for a motor mount.

In more detail, the cylindrical antivibration device 10 for a motor mount has a structure in which an inner shaft member 12 and an outer cylinder member 14 are connected to each other by a body rubber elastic element 16.

The inner shaft member 12 is a rod-shaped member extending in an axial direction, and has a substantially cylindrical shape extending straight in the present embodiment. The inner shaft member 12 is a highly rigid member formed of a metal, a synthetic resin reinforced with fibers, or the like.

The outer cylinder member 14 is a cylindrical member having a diameter larger than that of the inner shaft member 12 and extending in an axial direction, and has a substantially cylindrical shape extending straight in the present embodiment. The outer cylinder member 14 is a highly rigid member formed of a metal, a synthetic resin reinforced with fibers, or the like, similar to the inner shaft member 12.

In addition, the inner shaft member 12 is inserted into the outer cylinder member 14 on substantially the same central axis, and the inner shaft member 12 and the outer cylinder member 14 are elastically connected to each other by the body rubber elastic element 16. The body rubber elastic element 16 is a rubber elastic body having a substantially cylindrical shape in which an inner peripheral surface is firmly fixed to the outer peripheral surface of the inner shaft member 12, and an outer peripheral surface is firmly fixed to the inner peripheral surface of the outer cylinder member 14. In the present embodiment, the body rubber elastic element 16 is formed as an integrally vulcanization-molded product including the inner shaft member 12 and the outer cylinder member 14.

However, vulcanization adhesion to the inner shaft member 12 and the outer cylinder member 14 of the body rubber elastic element 16 is not essential, and for example, post-fixation may be performed. The body rubber elastic element 16 may be attached to the inner shaft member 12 and the outer cylinder member 14 through a fixing sleeve or the like, or the body rubber elastic element 16 may be attached to the inner shaft member 12 and the outer cylinder member 14 by non-adhesive press fitting or the like. In addition, the inner shaft member 12 may be in the form of a solid rod or a bolt, and the outer cylinder member 14 may be an irregular-shaped bracket including a circular mounting hole into which the body rubber elastic element 16 is mounted, a vehicle component such as a subframe, or the like.

The body rubber elastic element 16 has a substantially circular shape or an annular block shape that is continuous over an entire circumference in a circumferential direction. That is, the body rubber elastic element 16 is interposed between the surfaces of the inner shaft member 12 and the outer cylinder member 14 which face each other in a direction perpendicular to the shaft so as to be continuous over the entire circumference in the circumferential direction, and the surfaces of the inner shaft member 12 and the outer cylinder member 14 which face each other in a direction perpendicular to the shaft are connected to each other by the body rubber elastic element 16. In particular, the body rubber elastic element 16 of the present embodiment does not have a boring hole that is partially provided in the circumferential direction and penetrates in the axial direction.

Further, in the present embodiment, annular recesses 18 and 18 that open outward in the axial direction on both sides of the body rubber elastic element 16 in the axial direction are formed between the facing surfaces of the inner shaft member 12 and the outer cylinder member 14 in a radial direction. That is, the dimension in the axial direction of the body rubber elastic element 16 becomes gradually smaller toward a side of the outer cylinder member 14 from a side of the inner shaft member 12, and the dimension in the axial direction on the outer circumference side of the body rubber elastic element 16 is smaller than the dimension in the axial direction of the outer cylinder member 14. In addition, end faces on both sides in the axial direction (both sides in the right-left direction in FIG. 3) of the body rubber elastic element 16 are tapered inclined surfaces 20 and 20 that are gradually inclined inward in the axial direction from the inner circumference to the outer circumference, and thus the annular recesses 18 and 18 that are open outward in the axial direction with the tapered inclined surfaces 20 and as bottom faces are formed.

Meanwhile, in the present embodiment, the dimension in the axial direction of an inner circumferential end in the body rubber elastic element 16 is slightly smaller than that of the inner shaft member 12, while the dimension in the axial direction of an outer circumferential end in the body rubber elastic element 16 is smaller than that of the outer cylinder member 14. However, a thin cylindrical rubber part for vulcanization adhesion to the inner peripheral surface of the outer cylinder member 14 is integrally formed at the outer circumferential end of the body rubber elastic element 16. Thereby, an external force input between the inner shaft member 12 and the outer cylinder member 14 is applied to substantially the entirety of the body rubber elastic element 16.

Further, elastic protrusions 26 and 26 protruding outward in the axial direction (both sides in the right-left direction in FIG. 3) are provided on the tapered inclined surfaces 20 and 20 that are surfaces on both sides of the body rubber elastic element 16 in the axial direction. The elastic protrusions 26 and 26 have a curved shape extending in the circumferential direction with a cross-sectional shape protruding in a plate shape having a predetermined thickness, and are integrally formed with the body rubber elastic element 16.

Meanwhile, a specific shape and size of the elastic protrusion 26, the length thereof in the circumferential direction, and the like are not limited, and the direction of protruding may also be inclined with respect to the axial direction. However, in the present embodiment, the annular elastic protrusion 26 has a fixed cross-sectional shape and has a substantially cylindrical shape or an annular shape extending continuously over the entire circumference in the circumferential direction. In addition, the elastic protrusions 26 and 26 on both sides in the axial direction are formed to have the same shape and size.

The annular elastic protrusion 26 of the present embodiment extends substantially straight in the axial direction. Particularly, in the present embodiment, a protruding tip end of the annular elastic protrusion 26 protrudes outward in the axial direction from the outer cylinder member 14 and is positioned in the axial direction so as not to reach an outer end of the inner shaft member 12 in the axial direction.

In addition, the annular elastic protrusion 26 is supported in a continuous state by the protruding base end being provided integrally on the tapered inclined surface 20 with respect to the body rubber elastic element 16, and the protruding tip end is a free end so that the annular elastic protrusion 26 has a structure like a cantilever beam and protrudes from the body rubber elastic element 16.

A thickness dimension (W) of the annular elastic protrusion 26 is smaller than the dimension of the body rubber elastic element 16 in the radial direction, and the annular elastic protrusion 26 protrudes to extend in the axial direction between the surfaces of the inner shaft member 12 and the outer cylinder member 14 which face each other in the radial direction from the inside of the annular recess 18 and from an intermediate portion of the end face (tapered inclined surface) 20 of the body rubber elastic element 16 in the axial direction.

Particularly, in the present embodiment, the annular elastic protrusion 26 protrudes from substantially the center in the radial direction of the end face of the body rubber elastic element 16 in the axial direction. Meanwhile, in FIGS. 2 and 3, the tapered inclined surfaces 20 and 20 of the body rubber elastic element 16 which are base end faces of the annular elastic protrusions 26 and 26 are indicated by alternating two dots-dashed lines. As illustrated in the drawing, corner thickening (fillet R) for smooth connection is attached to a connection portion to the body rubber elastic element 16 at the base end part of the annular elastic protrusion 26.

The cylindrical antivibration device 10 for a motor mount of the present embodiment which is configured as described above is mounted between the electric motor for driving and the support member such as a vehicle body appropriately through a bracket or the like as illustrated in FIG. 3, for example, so as to cause the electric motor for driving to be antivibration-supported by the support member. In a specific example, the inner shaft member 12 is fixedly attached to a support member 30 on the vehicle body side by a fixing bolt 28, and the outer cylinder member 14 is fixedly attached by being pressed into a mounting hole provided in the electric motor for driving 32 (or a member on the electric motor for driving 32 side) or the like. Thereby, the cylindrical antivibration device 10 for a motor mount causes the electric motor for driving 32 of the battery-driven electric vehicle to be antivibration-supported by the vehicle body. Meanwhile, although the orientation of the cylindrical antivibration device 10 for a motor mount in a vehicle mounted state is not limited, the cylindrical antivibration device 10 for a motor mount is attached to extend in a substantially horizontal direction such that, for example, the front-back direction of the vehicle is parallel to or inclined with respect to the axial direction of the cylindrical antivibration device 10 for a motor mount.

Further, in such a cylindrical antivibration device 10 for a motor mount, vibration caused by a driving reaction of the electric motor for driving 32, a working reaction of the regenerative brake, driving torque vibration of the electric motor for driving 32, or reaction vibration of the regenerative brake, in addition to a static shared support load of electric motor for driving 32, is input in a direction perpendicular to the shaft between the inner shaft member 12 and the outer cylinder member 14 in a mounted state.

Here, in such a cylindrical antivibration device 10 for a motor mount, a slit hole or the like that penetrates in an axial direction are not provided, and thus, it is possible to advantageously secure support spring rigidity in a direction perpendicular to the shaft by adopting the body rubber elastic element 16 continuously elastically connecting the facing surfaces of the inner shaft member 12 and the outer cylinder member 14 in a direction perpendicular to the shaft over the entire circumference in the circumferential direction.

Particularly, the antivibration device for a motor mount does not require low dynamic spring properties of a low frequency range corresponding to idling vibration required for an antivibration device for a conventional internal combustion engine, and thus, a disadvantage of not adopting a slit hole that penetrates in the axial direction can be reduced. In addition, with respect to a substantially static external force which is relatively large in a direction perpendicular to the shaft and applied more frequently in the antivibration device for a motor mount than in the antivibration device for an internal combustion engine by a driving torque and a working reaction of a regenerative brake, it is possible to set effective support spring rigidity by a body rubber elastic element that does not include a slit hole.

Further, regarding a dynamic spring characteristic, in the antivibration device for a motor mount, antivibration performance based on low dynamic spring properties are required in a region reaching a higher frequency range than a vibration frequency to be subjected to antivibration in the antivibration device for a conventional internal combustion engine, and thus, antivibration performance in a high frequency range where vibration energy is particularly large tends to be a problem. With respect to a request for such antivibration performance, in the cylindrical antivibration device 10 for a motor mount of the present embodiment, it is possible to curb a significant increase in dynamic spring performance of the body rubber elastic element 16 by adopting the annular elastic protrusions 26 and 26 protruding in the axial direction from the body rubber elastic element 16. In addition, it is possible to realize satisfactory antivibration performance by avoiding a significant increase in dynamic spring performance over a wide frequency region of medium to high frequencies, particularly over a high frequency range that has not been a problem in the antivibration device for a conventional internal combustion engine.

Meanwhile, after analyzing the results many examinations and simulations by the inventor, it has been confirmed that, an effect of improving antivibration performance by curbing or avoiding a significance increase in dynamic spring performance of the body rubber elastic element 16 in a range of medium to high frequencies is achieved by the annular elastic protrusions 26 and 26, which is apparent from simulation results to be described later. However, a mechanism based on the annular elastic protrusions 26 and 26 is not simple. For example, it can also be considered that at least one or more of the following actions are acting additively or synergistically.

(i) Elastic deformation of the annular elastic protrusions 26 and 26 is applied to the body rubber elastic element 16 which is an integrally formed continuous body with a predetermined phase difference from the elastic deformation of the body rubber elastic element 16, and thus, an offset reduction effect is exerted on the amount of deformation or an input of the body rubber elastic element 16.

(ii) Elastic rigidity of the annular elastic protrusions 26 and 26, which is advantageously exhibited by being formed in an are plate shape or a cylindrical shape extending in a circumferential direction, contributes to elastic properties of the body rubber elastic element 16, and thus, an effect of curbing or avoiding a significance increase in dynamic spring performance due to surging in a frequency range of an antivibration target is exerted.

(iii) Vibration energy which is input is consumed by the vibration of the annular elastic protrusions 26 and 26, and thus, a reduction in energy of vibration of the body rubber elastic element 16 is achieved.

(iv) In the body rubber elastic element 16 which is continuous in the circumferential direction, both end faces of the body rubber elastic element 16 in the axial direction are repeatedly distorted when vibration is input, in association with different elastic deformation modes such as compression/tension/shearing at portions in the circumferential direction when vibration is input in a direction perpendicular to the shaft, and the annular elastic protrusions 26 and 26 are formed to be positioned at intermediate portions in the radial direction in which the amount of such distortion is maximized and to extend in the circumferential direction, whereby the effects as described in (i) to (iii) are more efficiently exhibited.

Figure 4A:
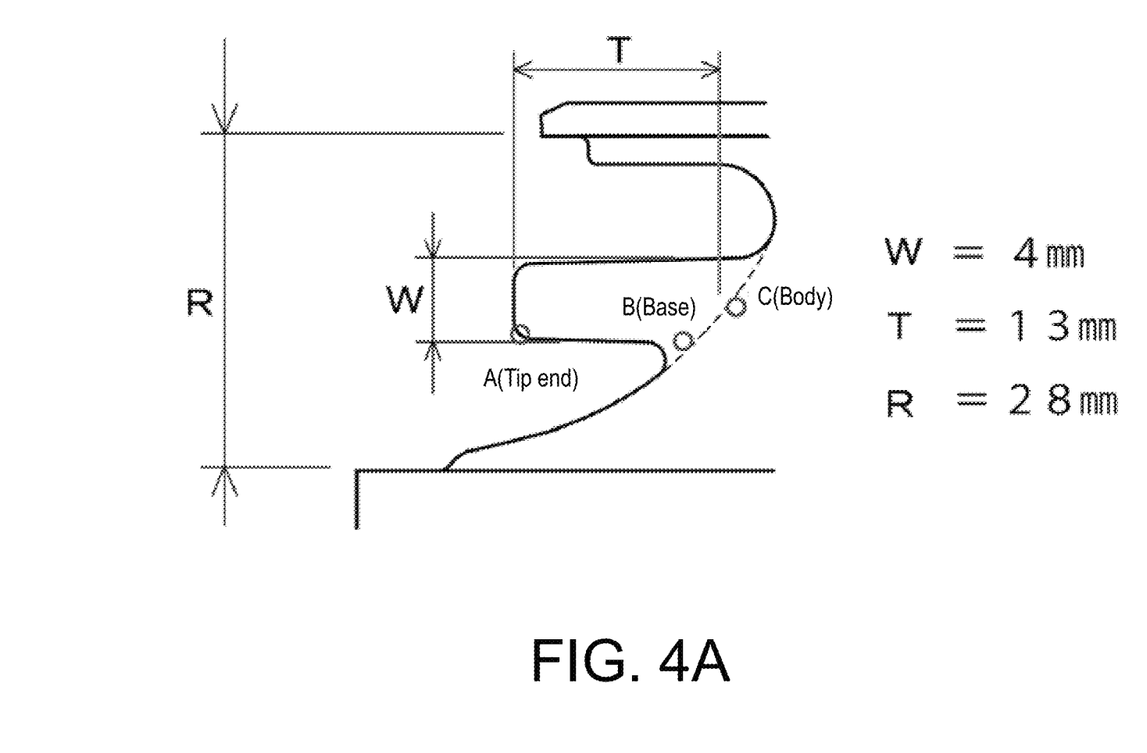
FIGS. 4A to 4C are graphs illustrating simulation results of frequency properties of a phase and an absolute spring constant according to an example of the cylindrical antivibration device for a motor mount illustrated in FIG. 1.
Figure 4B:
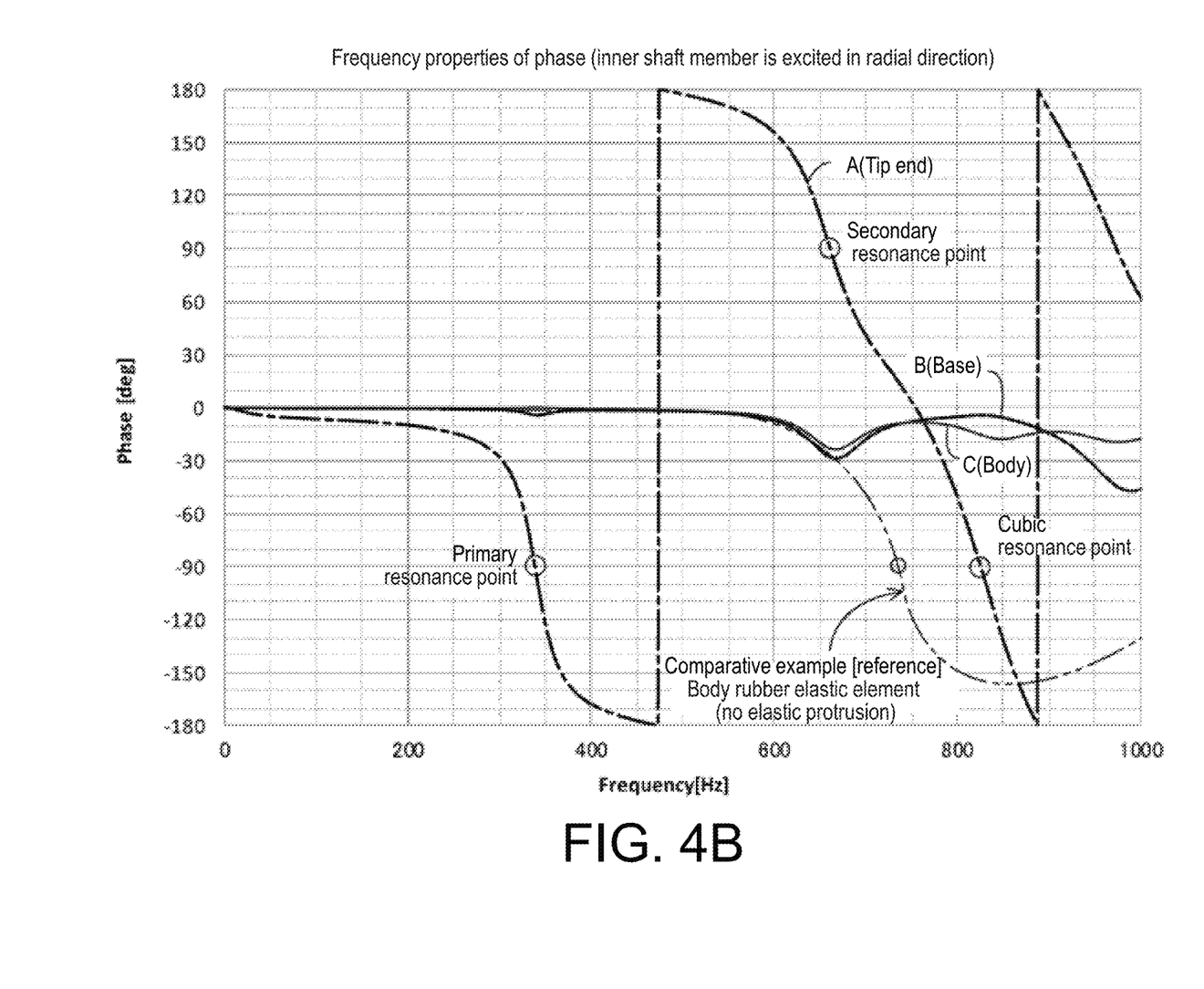
Figure 4C:
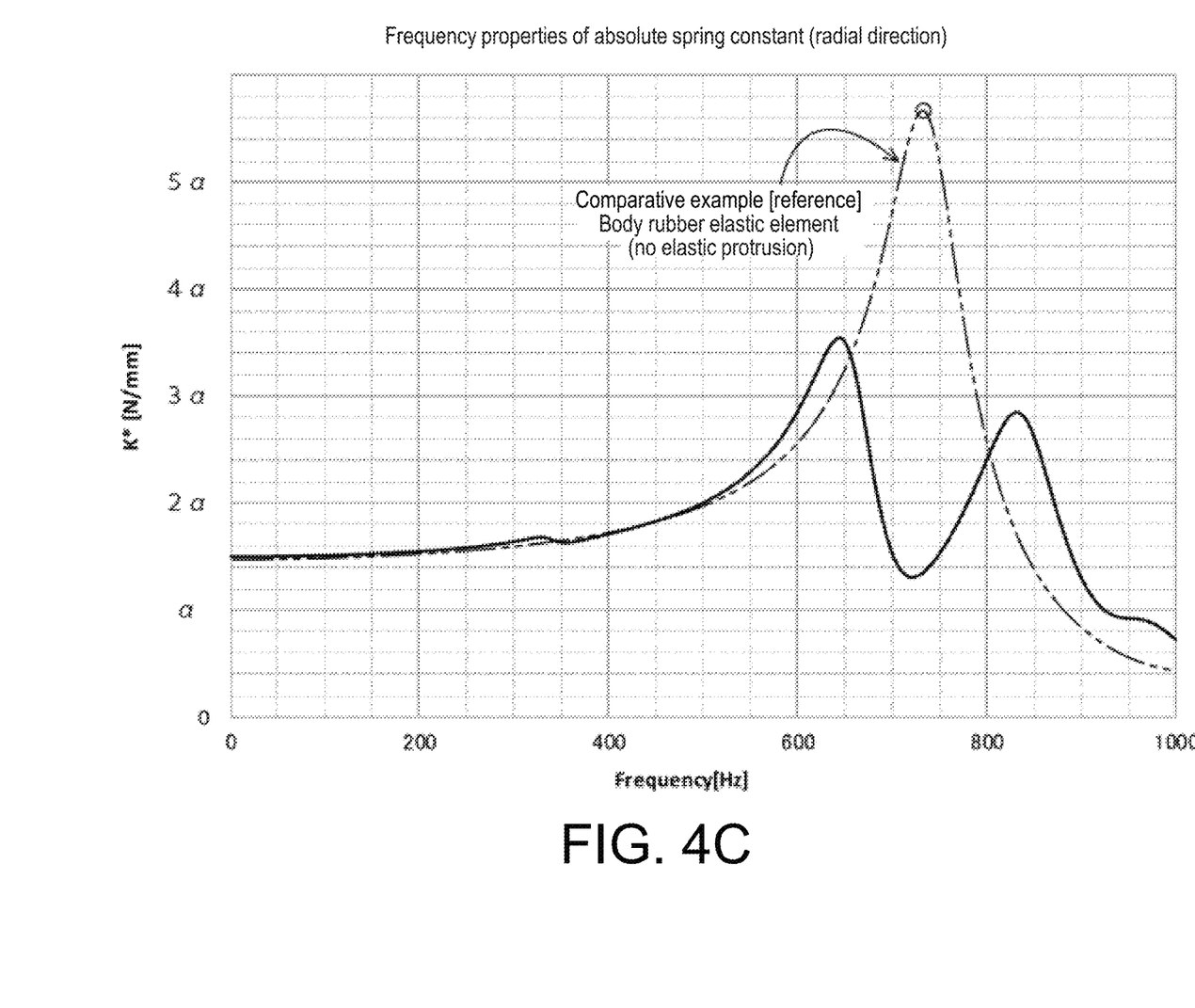

Incidentally. FIGS. 4A to 4C illustrate one simulation result. That is, as an example having dimensional conditions illustrated in FIG. 4A, the cylindrical antivibration device 10 for a motor mount of the present embodiment is specified, and changes in frequency of a phase (degrees) with respect to input vibration at A (the tip end of the annular elastic protrusion 26), B (the base of the annular elastic protrusion 26), and C (the central surface of the body rubber elastic element 16) are illustrated in FIG. 4B, and frequency properties of an absolute spring constant of the body rubber elastic element 16 are illustrated in FIG. 4C, in a case where an excitation input in one radial direction is applied to the inner shaft member 12. In addition, as a comparative example, for a cylindrical antivibration device for a motor mount, which is constituted by the body rubber elastic element 16 not including the annular elastic protrusion 26, simulation results under the same conditions are also shown in FIGS. 4B and 4C for reference.

As illustrated in FIG. 4C, in the comparative example in which the annular elastic protrusion 26 is not provided, a peak of an absolute spring constant due to surging of the body rubber elastic element 16 is observed in the vicinity of approximately 730 Hz, which is between 500 Hz and 1000 Hz. On the other hand, in the example in which the annular elastic protrusion 26 is provided, it can be understood that, a peak of an absolute spring constant due to such surging is suppressed.

In addition, from the phase illustrated in FIG. 4B, a primary resonance point of the annular elastic protrusion 26 can be confirmed at a frequency of approximately 340 Hz. Meanwhile, the resonance point can be grasped as a frequency at which a phase with respect to excitation is 90 degrees or −90 degrees regardless of the degree of attenuation.

From this, it can be understood that, an effect of suppressing a peak of an absolute spring constant of the body rubber elastic element 16 by the annular elastic protrusion 26 is not due to the action of a well-known dynamic vibration absorber (dynamic damper). That is, this is because it is established by tuning a primary resonance frequency of the annular elastic protrusion 26 which is a sub-vibration system so as to substantially match a surging frequency (approximately 730 Hz) of the body rubber elastic element 16 which is a main vibration system to be damped in the dynamic vibration absorber.

Additionally, from FIG. 4B, approximately 660 Hz (secondary resonance point) and approximately 830 Hz (cubic resonance point) are observed as secondary or higher multi-order resonance points of the annular elastic protrusion 26, but both of them are separated from the surging frequency (approximately 730 Hz) of the body rubber elastic element 16. In particular, the surging frequency of the body rubber elastic element 16 is positioned substantially in the center between two adjacent resonance points in the annular elastic protrusion 26, and the surging frequency is ¼ d or more, preferably ⅓ d or more away from any of the adjacent resonance points. Meanwhile, d is a separation frequency between resonance points adjacent to each other with the surging frequency of the body rubber elastic element 16 therebetween, and d=approximately 830 Hz—approximately 660 Hz=approximately 170 Hz in FIG. 4B.

In addition, from FIG. 4B, the secondary resonance point (approximately 660 Hz) of the annular elastic protrusion 26 is set to be on a low frequency side with respect to the surging frequency (approximately 730 Hz which is the primary resonance point) of the body rubber elastic element 16. In addition, a secondary resonance point of the annular elastic protrusion 26 is set in a frequency range where an absolute spring constant starts to rise due to the surging of the body rubber elastic element 16.

In addition, as illustrated in FIG. 4B as a comparative example, when the phase of the body rubber elastic element 16 approaches −90 degrees at the surging frequency (approximately 730 Hz) from 0 degrees, the phase of the annular elastic protrusion 26 changes to approach 0 degrees from +90 degrees at the secondary resonance point. However, the magnitude of a difference (phase difference) between the two (the phase of the single body rubber elastic element shown in the comparative example and the phase of the tip end of the annular elastic protrusion 26 shown in the example) is maintained at approximately 90 degrees or more, and particularly, a phase difference of the surging frequency (approximately 730 Hz) of the body rubber elastic element 16 is approximately 110 degrees.

For this reason, the phases of the two are opposite to each other over approximately ½ of the period, and particularly, the annular elastic protrusion 26 is excited and displaced in the opposite phase with respect to the body rubber elastic element 16 in the majority of the period in a region around the surging frequency of the body rubber elastic element 16 where a phase difference reaches approximately 110 degrees. As a result, the annular elastic protrusion 26 provides an effective resistance to the surging of the body rubber elastic element 16. Consequently, as shown in the graph of the example of FIG. 4B indicating that a vibration state of C (main body) maintains a phase angle of approximately 0 degrees, a change in the phase angle due to the surging of the body rubber elastic element 16 is suppressed by the action of the annular elastic protrusion 26. In addition, the surging itself of the body rubber elastic element 16 is avoided, and thus, it is considered that a suppression action is exhibited for an increase in an absolute spring constant due to the surging as illustrated in FIG. 4C.

Additionally, the annular elastic protrusion 26 has a shape like a cantilever, and an excitation point is at a base end side integrated with the body rubber elastic element 16. Thus, it can also be estimated that the phase of the tip end of the annular elastic protrusion 26 at the above-described frequency is delayed to some extent from the base end side. Then, a phase angle is on a positive side to some extent with respect to the phase angle shown in the graph of the example illustrated in FIG. 4B on the base end side of the annular elastic protrusion 26 where the annular elastic protrusion 26 applies an offset damping action on the body rubber elastic element 16, and thus, a phase difference between the body rubber elastic element 16 (the comparative example in which the annular elastic protrusion is not provided) and the annular elastic protrusion 26 in the surging region of the body rubber elastic element 16 becomes even larger than 90 degrees. As a result, it can also be considered that an offset damping action with respect to the surging of the body rubber elastic element 16 due to the annular elastic protrusion 26 can be more effectively exhibited.

Further, the annular elastic protrusion 26 which exhibits an effect of suppressing surging on the body rubber elastic element 16 is in a substantially resonance state and has a large vibration magnification, and thus, the annular elastic protrusion 26 can be a more effective resistance with respect to the surging of the body rubber elastic element 16.

In addition, the resonance state of the annular elastic protrusion 26 that exerts an effect of suppressing surging on the body rubber elastic element 16 is set to be a secondary or higher multi-order resonance point (a secondary resonance point in the present embodiment), and thus, it becomes easy to secure the mass m of a relatively large mass element at the time of tuning the resonance point of the annular elastic protrusion 26. That is, the surging frequency of the body rubber elastic element 16, which is a problem in the cylindrical antivibration device 10 for a motor mount, is in a relatively high frequency range, and it is not necessary to set a primary resonance point of the annular elastic protrusion 26 to be in a high frequency range by excessively increasing the cross-sectional area of the protruding base end part to increase a spring element k or excessively reducing the cross-sectional area of the protruding base end part to limit the mass m of the mass element at the time of tuning a resonance point of the annular elastic protrusion 26 in order to cope with the problem. For this reason, in the annular elastic protrusion 26, the mass m of the mass element is secured while avoiding the overall increase in size, and thus, it is possible to more efficiently obtain an acting force suppressing the displacement of the body rubber elastic element 16 as described above as an opposite phase.

In particular, the annular elastic protrusion 26 of the present embodiment is configured as an annular body which is continuous in the circumferential direction, and thus, it is possible to set a large spring element k (spring constant) of the annular elastic protrusion 26 even with a relatively small cross-sectional area as compared with a case where an elastic protrusion constituted by a rod-shaped protrusion having a cross-sectional shape such as a circular shape or a rectangular shape is provided. This is because shear deformation becomes dominant during vibration in a rod-shaped protrusion, while a cross-sectional coefficient is increased during vibration and a compression/tension component is also effectively generated in an elastic protrusion having an arc shape or an annular shape extending in the circumferential direction. Particularly, in the annular elastic protrusion 26 extending in the circumferential direction, a compression/tension component is increased in the deformation of the annular elastic protrusion 26 at the time of inputting vibration in portions positioned on both sides in a direction perpendicular to the shaft orthogonal to the direction perpendicular to the shaft, which is a main input direction of antivibration target vibration applied between the inner shaft member 12 and the outer cylinder member 14, and thus, it is desirable that an elastic protrusion is provided to extend in at least such a portion in the circumferential direction.

Meanwhile, in relation to the above-described consideration, a slight increase in an absolute spring constant is observed around the frequency range of primary resonance of approximately 340 Hz in the annular elastic protrusion 26 as illustrated in FIG. 4C. However, in the first place, it deviates from the surging frequency of the body rubber elastic element 16, and thus, an adverse effect on antivibration performance, which is a problem, is not observed.

Further, in the frequency range exceeding a resonance point in the frequency range of secondary resonance around at approximately 660 Hz in the annular elastic protrusion 26, an increase in an absolute spring constant is curbed offsetting the body rubber elastic element 16 due to a phase difference of the body rubber elastic element 16 under a surging state as described above. On the other hand, an increase in an absolute spring constant is observed due to a resonance action of the annular elastic protrusion 26 in a frequency range up to the resonance point, but this is not a major problem as compared with an increase in an absolute spring constant due to the surging of the body rubber elastic element 16 as the comparative example illustrated FIG. 4C.

Further, the body rubber elastic element 16 exceeds a surging frequency in the first place at a cubic or higher resonance frequency in the annular elastic protrusion 26, and thus, the surging of the body rubber elastic element 16 itself does not become a problem, and a dynamic spring constant is not increased. For this reason, multi-order resonance in the annular elastic protrusion 26 does not become a problem in a frequency range higher than the surging frequency of the body rubber elastic element 16.

In addition, as illustrated in FIG. 4B, when the surging frequency (a resonance point of approximately 730 Hz) of the body rubber elastic element 16 is exceeded, a phase difference from the annular elastic protrusion 26 suddenly becomes smaller than 90 degrees, and accordingly, an increase in the absolute spring constant is also observed as illustrated in FIG. 4C. However, as described above, the surging of the body rubber elastic element 16 itself does not become a problem in a frequency range exceeding the surging frequency of the body rubber elastic element 16, and thus, such a significant increase in a dynamic spring constant that the increase in a dynamic spring constant becomes a problem is not also observed.

Meanwhile, a specific size, shape, and the like of the annular elastic protrusion 26 are not limited, but for example, the following specific mode can be adopted appropriately in consideration of the above-mentioned action.

First, it is desirable that a protrusion height T (see FIG. 3) of the annular elastic protrusion 26 is smaller than a length L (see FIG. 3) of the body rubber elastic element 16 in the axial direction, and the protrusion height can be suitably set within a range of, for example, $0.1\ L \leq T \leq L$. Thereby, the securing of the effectiveness of an action of the annular elastic protrusion 26, the avoidance of interference with other members, and the like are realized, and it also becomes easy to reduce or avoid an adverse effect on elastic properties of the body rubber elastic element 16 due to, for example, multi-order resonance or the like of the annular elastic protrusion 26 itself.

Meanwhile, the protrusion height T of the annular elastic protrusion 26 is a substantial length of the annular elastic protrusion 26, and can be grasped as an effective length as an elastic protrusion. In FIG. 3, a protrusion height at the substantially center in the radial direction, which is a substantially average, is illustrated as the protrusion height T of the annular elastic protrusion 26. In addition, the length L of the body rubber elastic element 16 in the axial direction is a substantial length in the axial direction in the body rubber elastic element 16, and can be grasped as an effective length as an elastic body. In FIG. 3, a length in the axial direction at the substantially center in the radial direction, which is a substantially average, is illustrated as the length L of the body rubber elastic element 16 in the axial direction.

However, considering buffering, hitting, and the like against other members due to the deformation of the annular elastic protrusion 26, it is desirable that the position of a protruding tip end of the annular elastic protrusion 26 in the axial direction is on the inner side in the axial direction with respect to the position of the tip end of the inner shaft member 12 in the axial direction, and it is more desirable that the position of the protruding tip end of the annular elastic protrusion is on the inner side in the axial direction with respect to the position of the tip end of the body rubber elastic element 16 in the axial direction.

In addition, a thickness dimension W (see FIG. 3) of the annular elastic protrusion 26 is set to be smaller than a thickness dimension R (see FIG. 3) of the body rubber elastic element 16, and can be suitably set within a range of, for example, $0.1\ R \leq W \leq 0.8\ R$. Thereby, effectiveness of an action is achieved by securing rigidity, volume, and the like of the annular elastic protrusion 26, and it also becomes easy to reduce or avoid an adverse effect due to excessive restraint of the body rubber elastic element 16, or the like.

Meanwhile, the annular elastic protrusion 26 does not need to be provided in the middle (center) of the body rubber elastic element 16 in a thickness direction (a direction perpendicular to the shaft), may be provided at any position as long as it is an intermediate portion of the body rubber elastic element 16 excluding both end edges in the thickness direction, and may be provided to be biased to one side in the thickness direction. However, from the viewpoint of an action of efficiently curbing an increase in dynamic spring performance due to surging (primary resonance) of the body rubber elastic element 16, it is desirable that the annular elastic protrusion 26 is provided substantially at the center of the body rubber elastic element 16 in the thickness direction where the deformation displacement of the body rubber elastic element 16 tends to be increased.

Further, in the present embodiment, the thickness dimension W of the annular elastic protrusion 26 is slightly changed to correspond to a punching taper for demolding so that the thickness dimension W gradually decreases toward the protruding tip end from the protruding base end. In FIG. 3, a thickness dimension of a central portion in a protruding direction, which is a substantially average, is a substantial thickness dimension excluding a corner thickened portion of the protruding base end and is illustrated as the thickness dimension W of the annular elastic protrusion 26.

Further, it is desirable that a rubber volume $V_1$ of the annular elastic protrusion 26 is set to be smaller than a rubber volume $V_2$ of the body rubber elastic element 16, and can be suitably set in a range of, for example, $0.001\ V_2 \leq V_1 \leq 0.5\ V_2$. Thereby, effectiveness of an action is achieved by securing the mass of the annular elastic protrusion 26, or the like, and it also becomes easy to reduce or avoid an adverse effect on the body rubber elastic element 16 due to the annular elastic protrusion 26 which is provided.

Although the embodiment of the present invention has been described above, the present invention is not limitedly interpreted by the specific or limited description in the columns of "DESCRIPTION OF EMBODIMENTS" and "SOLUTION TO PROBLEM" described above, and can be implemented in a mode in which various changes, modifications, improvements, and the like are added on the basis of the knowledge of one of skilled in the art.

For example, the body rubber elastic element may have a solid shape that is continuous over the entire circumference in the circumferential direction, and a dimension thereof in the axial direction may be partially different in the circumferential direction by providing a bottomed narrowed hole that opens on both end faces in the axial direction according to required antivibration properties.

In addition, elastic protrusions on both sides of the body rubber elastic element in axial direction may have different shapes, sizes, and the like. In addition, the elastic protrusions may be inclined in the axial direction or may be bent or curved, and a mode in which thickness dimensions and the like may change in a protruding direction or a mode in which a shape such as a protrusion height or a thickness dimension in the circumferential direction changes may also be adopted. In addition, for example, one or a plurality of elastic protrusions may be partially provided in the circumferential direction of the body rubber elastic element. In a case where the elastic protrusion is partially provided in the circumferential direction, the total length of the elastic protrusion in the circumferential direction is preferably, for example, ⅓ or more of the circumference, and more preferably ½ or more of the circumference. Meanwhile, in a case where the elastic protrusion is provided over the entire circumference or is partially provided in the circumferential direction, the shape of the entire elastic protrusion may be a non-annular shape such as an ellipse, an oval, a semicircle, or a polygonal shape, in addition to the annular shape as in the above embodiment.

Figure 5:
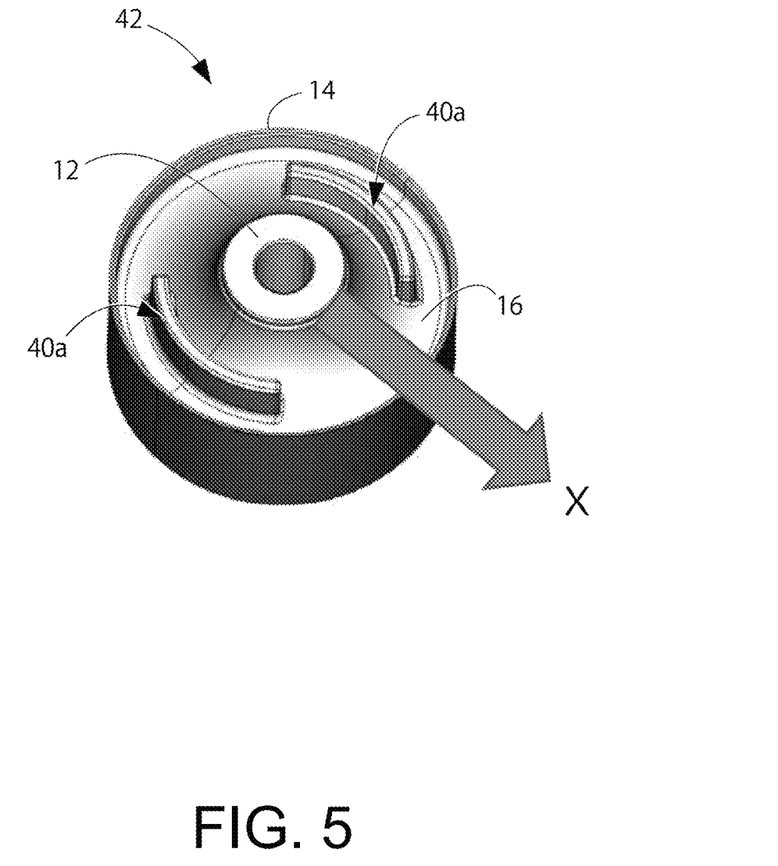
FIG. 5 is a perspective view illustrating a cylindrical antivibration device for a motor mount according to a second embodiment.

Incidentally, FIG. 5 illustrates a cylindrical antivibration device 42 for a motor mount according to a second embodiment of the present invention, the cylindrical antivibration device being provided with an elastic protrusion 40 in a mode different from the first embodiment. Meanwhile, in FIG. 5, members and portions having similar structures to those in the first embodiment are denoted by the same reference numerals and signs as in the first embodiment.

In the cylindrical antivibration device 42 for a motor mount of the present embodiment, the elastic protrusion 40 is integrally formed with each of both end faces of a body rubber elastic element 16 in the axial direction, similar to the first embodiment. Such an elastic protrusion 40 protrudes outward in the axial direction from a substantially central portion of the body rubber elastic element 16 in the radial direction, and extends in the circumferential direction around substantially the same center as the central axis of an inner shaft member 12.

Here, in the first embodiment, the annular elastic protrusion 26 extending in an annular shape to be continuous in the circumferential direction has been adopted, but the elastic protrusion 40 in the present embodiment is partially formed in the circumferential direction. Specifically, the elastic protrusions 40 are constituted by a pair of arc wall-shaped elastic protrusions 40a and 40a provided to face each other in one radial direction with the central axis of the body rubber elastic element 16 interposed therebetween.

The elastic protrusion 40 in the present embodiment is provided integrally with the body rubber elastic element 16 at the base end portion thereof similar to the annular elastic protrusion 26 in the first embodiment, and is configured as a free end at the tip end portion thereof. In addition, vibration from the body rubber elastic element 16 is input to the elastic protrusion 40 as an excitation force at the base end portion, and the elastic protrusion 40 is elastically deformed in a mode like a substantially cantilever as a whole to cause excitation deformation.

Thus, even in the cylindrical antivibration device 42 for a motor mount of the present embodiment, it is possible to suppress a peak of an absolute spring constant caused by the surging of the body rubber elastic element 16 by an offset surging suppression effect or the like based on a phase difference between the body rubber elastic element 16 and the elastic protrusion 40 by tuning a resonance frequency of the elastic protrusion 40 in consideration of surging properties of the single body rubber elastic element 16, similar to the first embodiment.

Meanwhile, since the body rubber elastic element 16 is provided continuously over the entire circumference in the circumferential direction between the inner shaft member 12 and the outer cylinder member 14, any part in the circumferential direction is can be elastically deformed when vibration is input in any direction perpendicular to the shaft, and thus it is considered that a surging phenomenon also occurs as a whole. For this reason, the elastic protrusion can be provided with any size or the like at any position in the circumferential direction in the body rubber elastic element 16, and it is possible to tune a resonance frequency or the like of the elastic protrusion according to a relative position, size, shape, and the like with respect to input vibration.

Figure 6:
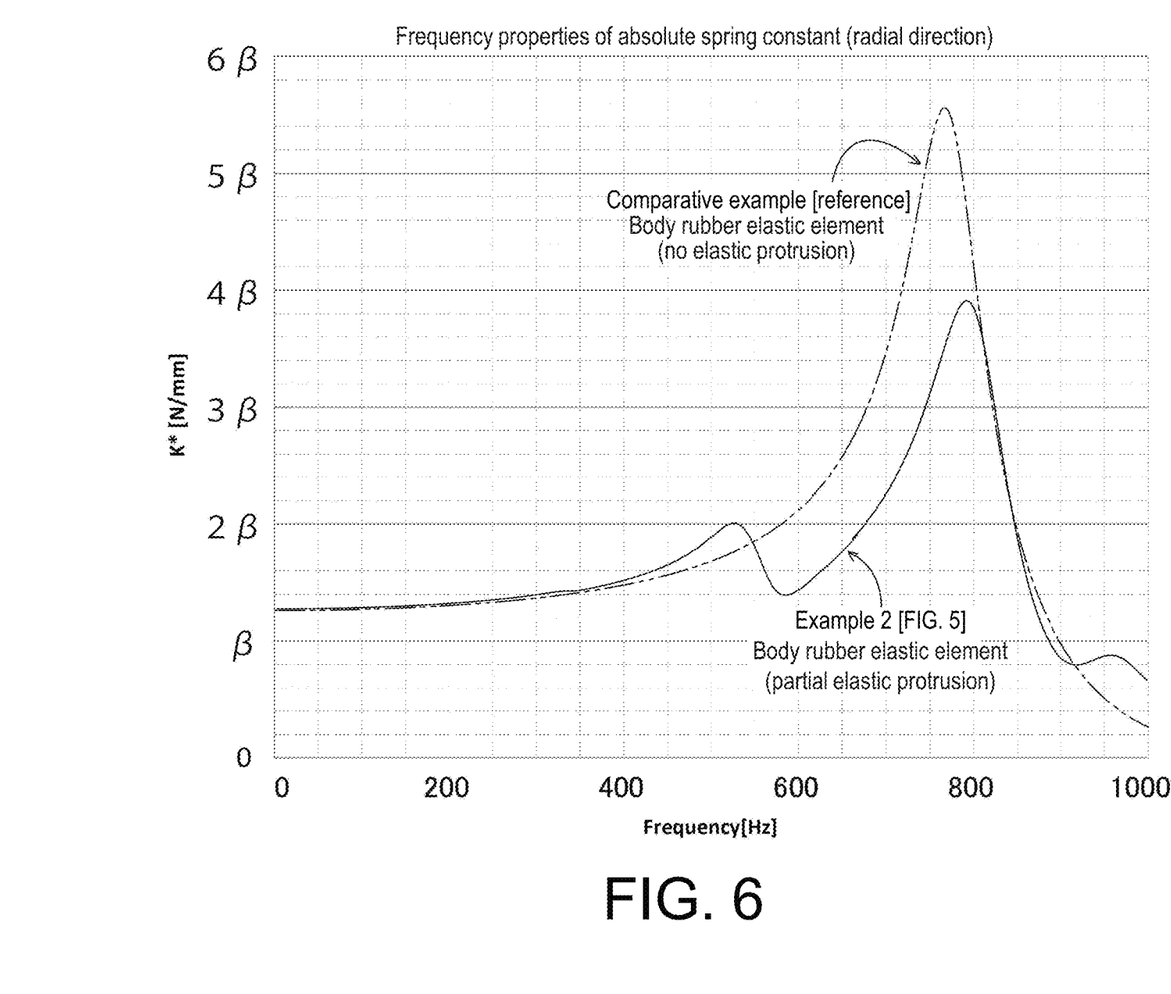
FIG. 6 is a graph illustrating simulation results of frequency properties of a phase and an absolute spring constant according to an example of the cylindrical antivibration device for a motor mount illustrated in FIG. 5.

Incidentally, in the present embodiment, results obtained by measuring frequency properties of an absolute spring characteristic in a case where an excitation force is applied between the inner shaft member 12 and the outer cylinder member 14 in an X direction in FIG. 5, which is a direction orthogonal to the radial direction in which the pair of elastic protrusions 40a and 40a face each other, through simulation are illustrated in FIG. 6. Meanwhile, properties obtained by performing the same simulation on a cylindrical antivibration device including a body rubber elastic element not provided with an elastic protrusion are illustrated in FIG. 6 as a comparative example. Further, in the present embodiment, similar to the first embodiment, a primary resonance frequency of the pair of elastic protrusions 40a and 40a is set to be in a low frequency range of f0×¾ or less, and more preferably a sufficiently low frequency range of f0×⅔ or less with respect to a surging frequency f0 of the body rubber elastic element. In addition, secondary resonance frequencies of the pair of elastic protrusions 40a and 40a are set to be on a frequency side lower than the surging frequency of the body rubber elastic element, and cubic resonance frequencies of the pair of elastic protrusions 40a and 40a are set to be on a frequency side higher than the surging frequency of the body rubber elastic element.

As a result, as can be seen from FIG. 6, also in the cylindrical antivibration device 42 for a motor mount of the present embodiment, it is recognized that an effect of suppressing a peak of an absolute spring constant caused by the surging of the body rubber elastic element 16 is exhibited, the effect being considered to be obtained by an offset surging suppression action based on a phase difference between the body rubber elastic element 16 and the elastic protrusion 40, similar to the first embodiment. However, the simulation results described in the first and second embodiments are examples showing operational effects for confirmation, and are not obtained by performing optimal tuning on the elastic protrusion. For this reason, it should be understood that more excellent frequency properties of an absolute spring constant can be realized by further tuning the size and shape of the elastic protrusion, or spring and mass elements.

Further, in a case where a plurality of elastic protrusions is provided, the elastic protrusions do not need to have the same shape, size, and the like and may be provided at positions different from each other in a radial direction. Meanwhile, in a case where a plurality of elastic protrusions is provided independently in a circumferential direction, it is desirable that the elastic protrusions are provided to face each other in a main vibration input direction and/or in a direction perpendicular to the shaft orthogonal to the main vibration input direction.

However, in the embodiment, the elastic protrusions 26, 26, 40, and 40 are provided on both sides of the body rubber elastic element 16 in the axial direction, but the elastic protrusions may be provided on only one side of the body rubber elastic element 16 in the axial direction. The inventor performed a simulation in the same manner as in the first embodiment in a mode in which the annular elastic protrusion 26 which is the same as that in the first embodiment is provided on only one side of the body rubber elastic element 16 in the axial direction. As a result, the degree of an effect is smaller than that in the first embodiment in which elastic protrusions are provided on both sides in the axial direction with respect to an increase in an absolute spring constant due to the surging of the body rubber elastic element 16, but it has been confirmed that substantially the same suppression effect can be exhibited.

Further, in the above-described embodiments, one annular elastic protrusion 26 is provided on each of both end faces (the tapered inclined surfaces 20 and 20) of the body rubber elastic element 16 in the axial direction, but for example, a plurality of elastic protrusions having an annular shape and/or a non-annular shape may be provided at different positions in a direction perpendicular to the shaft on each of both end faces of the body rubber elastic element in the axial direction.

In addition, a battery-driven electric vehicle to which the cylindrical antivibration device 10 for a motor mount of the above-described embodiment is applied is an electric vehicle including a battery having power for driving an electric motor among electric vehicles including an electric motor as a main driving source. Examples of the battery-driven electric vehicle include a secondary battery-driven electric vehicle, a fuel cell-powered electric vehicle, an electric vehicle equipped with a generator (range extender), and a solar car, and particularly, include an electric vehicle in which an internal combustion engine serving as a driving source is not provided to be antivibration-supported integrally with an electric motor. However, an electric vehicle to which the cylindrical antivibration device for a motor mount of the present invention is applied does not need to be a battery-powered electric vehicle and may be provided with an electric motor for driving.

Meanwhile, in the embodiment, the inner shaft member 12 is fixed to the support member 30 on the vehicle body side, and the outer cylinder member 14 is fixed to the electric motor for driving 32 (or a member on the electric motor for driving 32 side). However, an arrangement mode and a supporting mode of the electric motor for driving are not limited, and the present invention is also applicable to, for example, a motor mount or the like in an electric vehicle where an electric motor for driving is mounted on an axle side supported through a suspension mechanism.

The invention claimed is:

1. A cylindrical antivibration device for a motor mount, which is configured such that an inner shaft member and an outer cylinder member are connected to each other by a body rubber elastic element and is mounted between an electric motor for driving of a vehicle and a support member, wherein facing surfaces of the inner shaft member and the outer cylinder member in a direction perpendicular to a shaft are continuous over an entire circumference in a circumferential direction and are connected to each other by the body rubber elastic element, and an elastic protrusion that protrudes outward in an axial direction at an intermediate portion between the facing surfaces of the inner shaft member and the outer cylinder member and extends in the circumferential direction is formed integrally with the body rubber elastic element on an end face of the body rubber elastic element in the axial direction;

wherein a protrusion height of the elastic protrusion is set as T, and a length of the body rubber elastic element in the axial direction is set as L, $0.1 \leq L \leq T \leq L$ is satisfied;

wherein a thickness dimension of the elastic protrusion is set as W, and a thickness dimension of the body rubber elastic element is set as R, $0.1\,R \leq W \leq 0.8\,R$ is satisfied.

2. The cylindrical antivibration device for a motor mount according to claim 1, wherein the elastic protrusion is an annular elastic protrusion provided continuously over an entire circumference of the body rubber elastic element in the circumferential direction.

3. The cylindrical antivibration device for a motor mount according to claim 1, wherein both end faces of the body rubber elastic element in the axial direction are configured as tapered inclined surfaces by a dimension of the body rubber elastic element in the axial direction gradually decreasing toward a side of the outer cylinder member from a side of the inner shaft member, and the elastic protrusion protrudes from the tapered inclined surface of the body rubber elastic element.

4. The cylindrical antivibration device for a motor mount according to claim 1, wherein a protrusion height of the elastic protrusion protruding from a surface of the body rubber elastic element is smaller than a length of the body rubber elastic element in the axial direction.

5. The cylindrical antivibration device for a motor mount according to claim 1, wherein a thickness dimension of the elastic protrusion of the body rubber elastic element in the direction perpendicular to the shaft is ⅓ or less of a thickness dimension of the body rubber elastic element.

6. The cylindrical antivibration device for a motor mount according to claim 1, wherein a thickness dimension of the elastic protrusion of the body rubber elastic element in the direction perpendicular to the shaft decreases toward a tip end side from a base end side of the elastic protrusion.

7. The cylindrical antivibration device for a motor mount according to claim 1, wherein a main input direction of antivibration target vibration applied between the inner shaft member and the outer cylinder member is one direction of the direction perpendicular to the shaft, and the elastic protrusion is present on at least both sides in the direction perpendicular to the shaft orthogonal to the main input direction of the antivibration target vibration and extends in the circumferential direction.

8. The cylindrical antivibration device for a motor mount according to claim 1, wherein
an electric motor for driving of a battery-driven electric vehicle is antivibration-supported,
the body rubber elastic element has a peak of an absolute spring constant due to surging in a frequency range of 500 Hz to 1000 Hz,
a secondary resonance point in the elastic protrusion is set to be in a frequency range lower than the peak of the absolute spring constant due to the surging of the body rubber elastic element, and
the peak of the absolute spring constant due to the surging of the body rubber elastic element is reduced on the basis of an elastic deformation action of the elastic protrusion having a phase difference from the body rubber elastic element by providing the elastic protrusion.

* * * * *